United States Patent
Calo et al.

(10) Patent No.: US 9,813,295 B2
(45) Date of Patent: Nov. 7, 2017

(54) WIRELESS NETWORK OPTIMIZATION APPLIANCE

(71) Applicant: International Business Machines Corporation, Armonk, NY (US)

(72) Inventors: Seraphin B. Calo, Cortland Manor, NY (US); William Cornejo, Woodhaven, NY (US); Keith Grueneberg, Stewart Manor, NY (US); Franck Le, White Plains, NY (US); Erich M. Nahum, New York, NY (US); Maroun Touma, Redding, CT (US); Dinesh C. Verma, New Castle, NY (US); Ho Yin Starsky Wong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 13/667,038

(22) Filed: Nov. 2, 2012

(65) Prior Publication Data
US 2014/0126378 A1    May 8, 2014

(51) Int. Cl.
*H04L 12/24* (2006.01)
*H04W 24/02* (2009.01)
*H04L 12/801* (2013.01)
*H04L 12/26* (2006.01)

(52) U.S. Cl.
CPC ......... *H04L 41/0836* (2013.01); *H04W 24/02* (2013.01); *H04L 43/10* (2013.01); *H04L 47/14* (2013.01)

(58) Field of Classification Search
USPC ........ 370/230, 231, 237, 235, 241; 709/203, 709/223, 224, 227, 230–235, 238–241
See application file for complete search history.

(56) References Cited

U.S. PATENT DOCUMENTS

| | | | |
|---|---|---|---|
| 7,567,504 B2 | 7/2009 | Darling et al. | 370/216 |
| 8,073,968 B1 | 12/2011 | Shah et al. | 709/238 |
| 2006/0253745 A1* | 11/2006 | Maso et al. | 714/47 |
| 2007/0220375 A1* | 9/2007 | Baz | 714/55 |
| 2008/0229021 A1* | 9/2008 | Plamondon | 711/125 |
| 2008/0288607 A1* | 11/2008 | Muchow | G06F 9/44505 709/209 |
| 2010/0067537 A1 | 3/2010 | Ramakrishnan et al. | 370/411 |
| 2011/0041009 A1* | 2/2011 | Hom | G06F 11/0715 714/23 |
| 2011/0153721 A1* | 6/2011 | Agarwal et al. | 709/203 |
| 2012/0173759 A1* | 7/2012 | Agarwal | H04L 67/2814 709/241 |

(Continued)

*Primary Examiner* — Edan Orgad
*Assistant Examiner* — Saumit Shah
(74) *Attorney, Agent, or Firm* — Ryan, Mason & Lewis, LLP

(57) ABSTRACT

Methods and apparatus are provided for wireless network optimization. Wireless network traffic is optimized by receiving redirected traffic based on one or more configuration rules; and applying the redirected traffic to a protocol optimizer that optimizes the wireless network traffic based on one or more optimization rules. A management interface is optionally provided to manage the network optimization appliance. A process monitor is optionally provided to monitor one or more process threads to determine if the process threads have stalled. The process monitor can monitor other components and can be monitored by at least one other component.

20 Claims, 7 Drawing Sheets

(56) References Cited

U.S. PATENT DOCUMENTS

2012/0307631 A1* 12/2012 Yang et al. .................. 370/230
2013/0121209 A1*  5/2013 Padmanabhan ..... H04L 41/0823
                                                    370/255

* cited by examiner

FIG. 4B

CONFIGURE WCCP PARAMETERS

NOA and IP Address: | 0 | 2 | 4 | 75 |

WCCP ROUTER

Router 1 IP Address: | 0 | 2 | 4 | 67 |
Router 2 IP Address: | 0 | 2 | 4 | 67 |
Ingress Service ID: | 69 |
Egress Service ID: | 62 |

WCCP GRE TUNNELING

Router 1 Loopback IP Address: | 0 | 2 | 4 | 24 |
Router 2 Loopback IP Address: | 0 | 2 | 4 | 25 |

[Update] [Cancel]

_482_

| Name | Description | Status | Start | Stop |
|---|---|---|---|---|
| wccpClient | WCCP Service | *Stopped* | △ | □ |
| tcp-proxy | TCP Proxy Service | *Stopped* | △ | □ |

_484_

_480_

WIRELESS NETWORK OPTIMIZATION APPLIANCE

FIELD OF THE INVENTION

The present invention relates generally to techniques for network optimization.

BACKGROUND OF THE INVENTION

The wireless access of users to remote services, such as web, data centers or cloud-based services, is typically not as efficient as it could be. Thus, network optimization technology is often employed. Generally, network optimization techniques attempt to reduce the amount of traffic traveling on a high latency wide area network (WAN). Traditional solutions for performing network optimization fall into one of two categories.

Data compression employs two networking devices that are deployed at two remote segments of the network using compression/decompression techniques in order to reduce the amount of data that travels over the WAN thus increasing the effective throughput seen by the end user located at the edge of the network. Data compression techniques thus require a static deployment topology where both the sender and receiver are located in two different segments of the network, where each segment is served by a compression device and both compression devices use the same protocol.

Data caching employs one or more network devices deployed at each edge of the network acting as a cache proxy and serving the needs of a specific cluster of users in a local area network (LAN). Specific requests from those users on the LAN are first routed to a cache proxy. If the request cannot be fulfilled by the local cache proxy, then the request is forwarded to remote servers via the WAN. Caching techniques are limited to optimizing download traffic that originates from the LAN and cannot be used to optimize upload traffic.

A need remains for network optimization techniques that address the characteristics of Wireless networks, such as high packet loss and mobility. A further need remains for network optimization techniques in a wireless environment that can optimize both download and upload traffic, peer-to-peer traffic, video streaming and a diverse set of protocols that are based on TCP/IP (Transmission Control Protocol/Internet Protocol).

SUMMARY OF THE INVENTION

Generally, methods and apparatus are provided for wireless network optimization. According to one aspect of the invention, wireless network traffic is optimized by receiving redirected traffic based on one or more configuration rules; and applying the redirected traffic to a protocol optimizer that optimizes the wireless network traffic based on one or more optimization rules.

A management interface is optionally provided to manage the network optimization appliance. A process monitor is optionally provided to monitor one or more process threads to determine if the process threads have stalled. The process monitor can monitor other components and can be monitored by at least one other component.

In one exemplary embodiment, the configuration rules specify that at least a portion of the wireless network traffic that is processed by the network optimization appliance is marked. In another embodiment, the configuration rules specify a given port where the wireless network traffic should be forwarded for network optimization.

A more complete understanding of the present invention, as well as further features and advantages of the present invention, will be obtained by reference to the following detailed description and drawings.

BRIEF DESCRIPTION OF THE DRAWINGS

FIG. 4B illustrates an exemplary interface for the Appliance Management Console of FIG. 3 to define and/or configure the network optimization appliance;

DETAILED DESCRIPTION OF PREFERRED EMBODIMENTS

Embodiments of the present invention provide a network optimizer. According to one aspect of the invention, the disclosed network optimization appliance can be integrated with a high-availability monitoring of system components. In this manner, high-grade resiliency is provided for network operations.

According to a further aspect of the invention, the disclosed network optimization appliance optionally employs policy based management and configuration of the components within the network. In this manner, the disclosed appliance architecture interface can be extended to other functions, e.g., an integration with resiliency provided by multiple instances of network optimization appliances.

Figure 1:
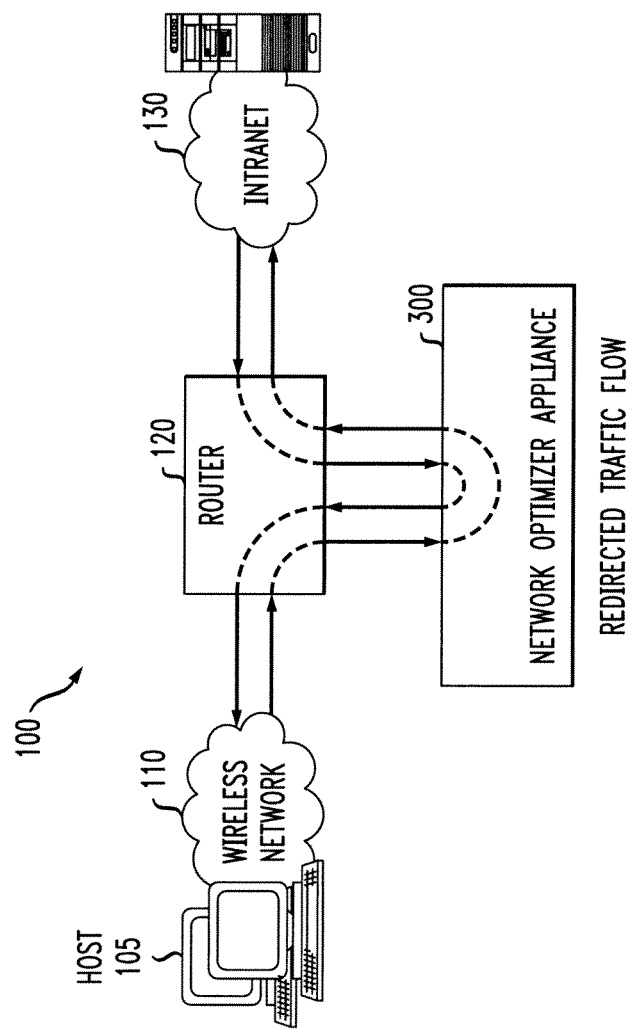
FIG. 1 illustrates an exemplary network environment in which the present invention can be employed.

FIG. 1 illustrates an exemplary network environment 100 in which the present invention can be employed. As shown in FIG. 1, the exemplary network environment 100 comprises a router 120 for routing traffic between a wireless network 110 and an intranet 130.

According to one aspect of the invention, traffic that is originating from the wireless network 110 or destined to the wireless network 110 is routed by the router 120 to a network optimization appliance 300, as discussed further below in conjunction with FIG. 3, for both egress and ingress traffic. In one exemplary implementation, the wireless traffic is routed by the router 120 to the network optimization appliance 300 by having the network optimization appliance 300 initiate a protocol configuration session (such as Web Cache Communication Protocol (WCCP)) to pre-program the routers 120 to redirect specific traffic to the appliance. For example, as discussed further below in conjunction with FIG. 3, configuration rules can be created that specify that any traffic that matches an IP tuple rule should be forwarded to the network optimization appliance 300. IP tuple rules can be static rules or dynamically defined rules based on various connection parameters, such as round trip delay and retransmitted packets. For example, an IP tuple rule can specify that all traffic associated with a given IP address or range of IP addresses should be optimized.

When a connection is initiated by a wireless host 105 connected via the wireless network 110, the router 120 redirects the request to the network optimization appliance (NOM 300, acting as a fully transparent proxy. When the network optimization appliance 300 intercepts the request redirected by the router 120, the network optimization appliance 300 establishes a connection with the destination host on the Intranet 130 or Internet on behalf of the wireless host 105.

As such, for each TCP session between a wireless host 105 and a host on the wide area network, the exemplary network optimization appliance 300 creates and manages two connections: one connection with the source wireless host 105 and one connection with the destination remote host (not shown) on the WAN.

Figure 2:
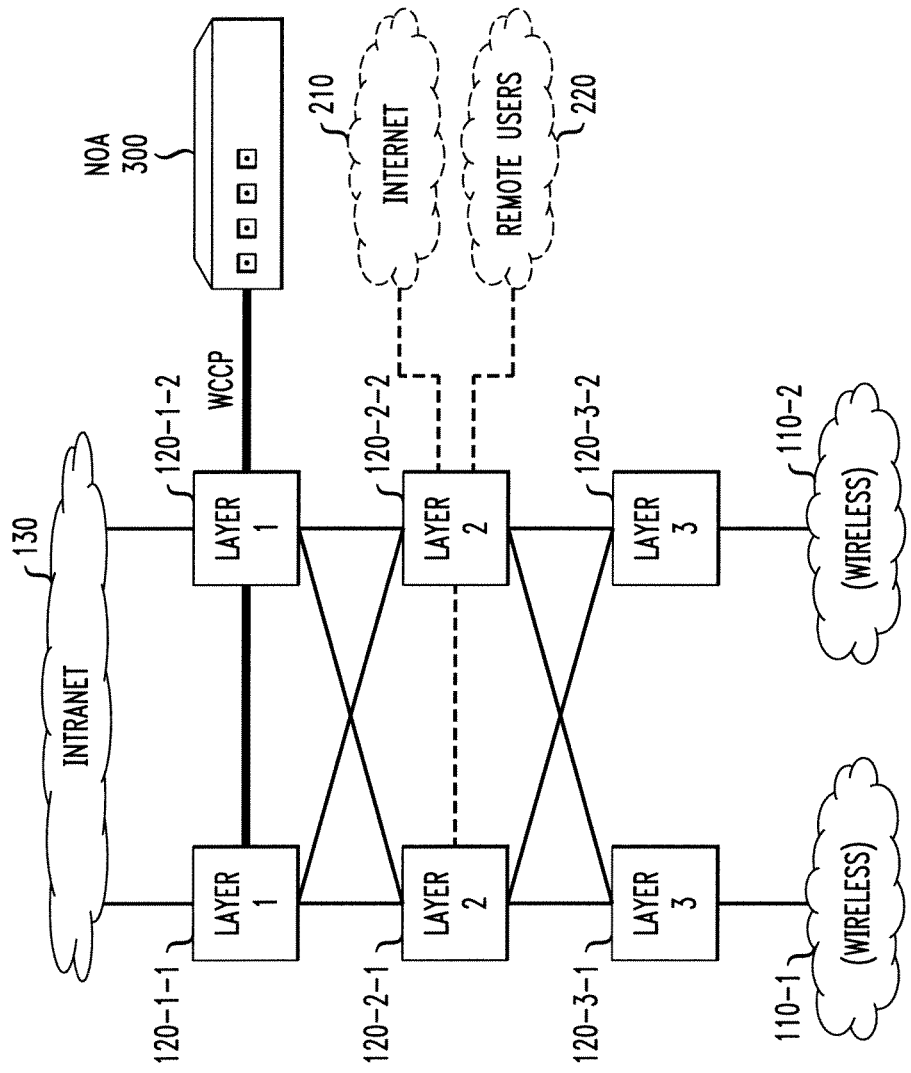
FIG. 2 illustrates an exemplary enterprise network environment having a layered architecture in which the present invention can be employed.

FIG. 2 illustrates an exemplary network environment in which the present invention can be employed. In particular, FIG. 2 illustrates how the network optimization appliance 300 can be deployed in an exemplary enterprise network environment that uses a layered architecture, where each layer controls access to a specific portion of the network. The exemplary enterprise network environment comprises three layers. A first layer (Layer 3) aggregates clusters of wireless users. A second layer (Layer 2) provides access to the Internet 210 and remote users 220. A third layer (Layer 1) provides access to the Intranet 130.

As discussed hereinafter, the network optimization appliance 300 can be attached to any layer of the network based on the desired scope of optimization. For example, in order to optimize all wireless traffic, the network optimization appliance 300 is connected to Layer 3. In order to optimize wireless traffic that is only accessing the Intranet 130, the network optimization appliance 300 is connected to Layer 1 (as shown in the exemplary embodiment of FIG. 2). In order to optimize wireless traffic that is accessing both the Intranet 130 and Internet 210, the network optimization appliance 300 is connected to Layer 2. FIG. 2 also illustrates how two routers can be used in parallel for each layer to provide redundancy and load balancing and attached to the same instance of the network optimization appliance 300 using a redirection protocol, such as WCCP.

Figure 3:
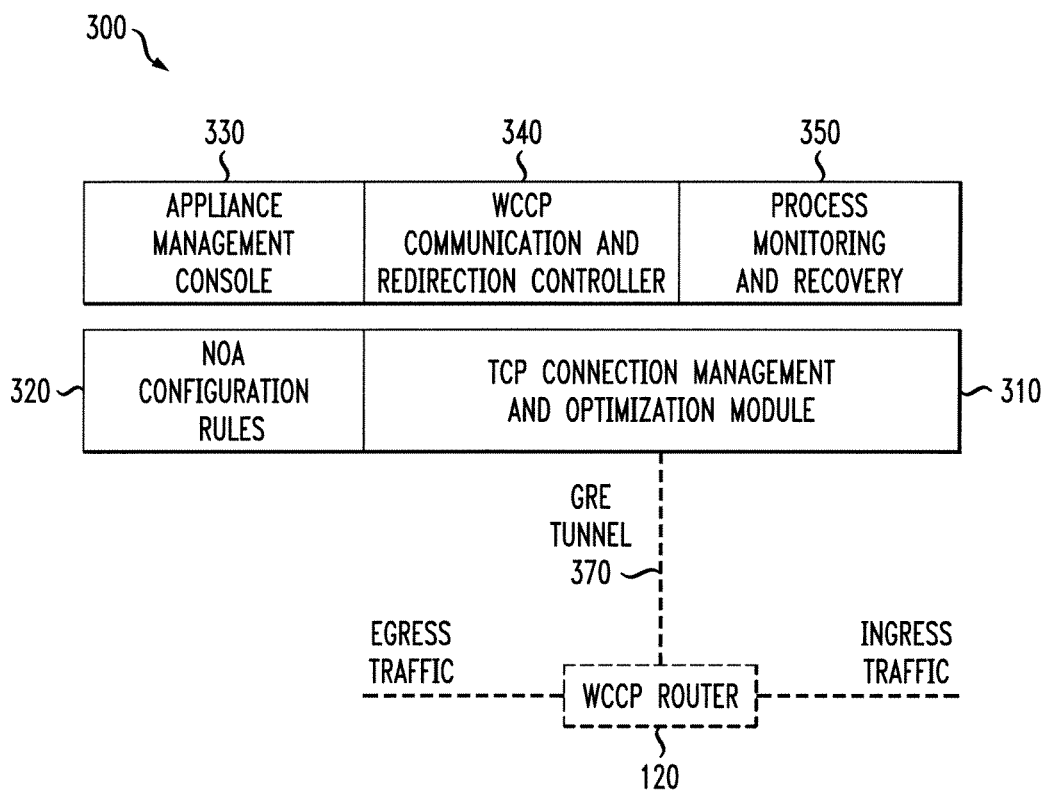
FIG. 3 illustrates an exemplary software stack for the network optimization appliance.

FIG. 3 illustrates an exemplary software stack for the network optimization appliance 300. As shown in FIG. 3, the exemplary software stack comprises a TCP connection management and optimization module 310, network optimization appliance configuration rules 320, an appliance management console 330, a WCCP communication and redirection controller 340 and a process monitor and recovery module 350.

Generally, the TCP Connection Management and Optimization Module 310 manages all inbound and outbound connections and the data flow between the source and destination, as discussed further below in conjunction with FIG. 4A. The network optimization appliance configuration rules 320 comprise a set of rules defining the wireless traffic that should be optimized. In addition, the rules 320 can specify that some or all traffic that is processed by the network optimization appliance 300 is marked, and can identify a given port where the traffic should be forwarded in order to route the traffic to the network optimization appliance 300.

When a TCP session is redirected to the network optimization appliance 300 based on the configuration rules 320, the network optimization appliance 300 uses any number of techniques, generally referred to as optimization rules, to improve the end-to-end throughput of the TCP session. Unlike the configuration rules 320 that are based on the TCP tuple, the optimization rules are based on TCP flow control parameters, such as window size, buffer size, round trip delay, congestion control, preferred path, traffic type (e.g., data or video) and number of retransmits detected. In one embodiment, an optimization rule may set a higher maximum TCP window size. In another embodiment, the network optimization appliance 300 may provide acknowledgement of received packets to the server on behalf of the client in order to prevent the server from decreasing its window size.

The configuration rules 320 and/or the optimization rules may be implemented, for example, by an algorithm and/or a state machine.

The appliance management console 330 provides an interface for managing the network optimization appliance 300, as discussed further below in conjunction with FIG. 4B. As discussed further below in conjunction with FIG. 4C, the exemplary WCCP communication and redirection controller 340 implements a WCCP client for configuring and maintaining connectivity with the router 120 to redirect specific traffic to the appliance 300 including: session initiation, negotiation, redirection, and a keep-alive message.

Finally, the process monitor and recovery module 350 provides process resilience and monitors each of the processes running on the appliance. If any of the processes fail, it is detected and automatically restarted. If the process monitoring component itself fails, any of the other components monitors it and restarts it.

Figure 4A:
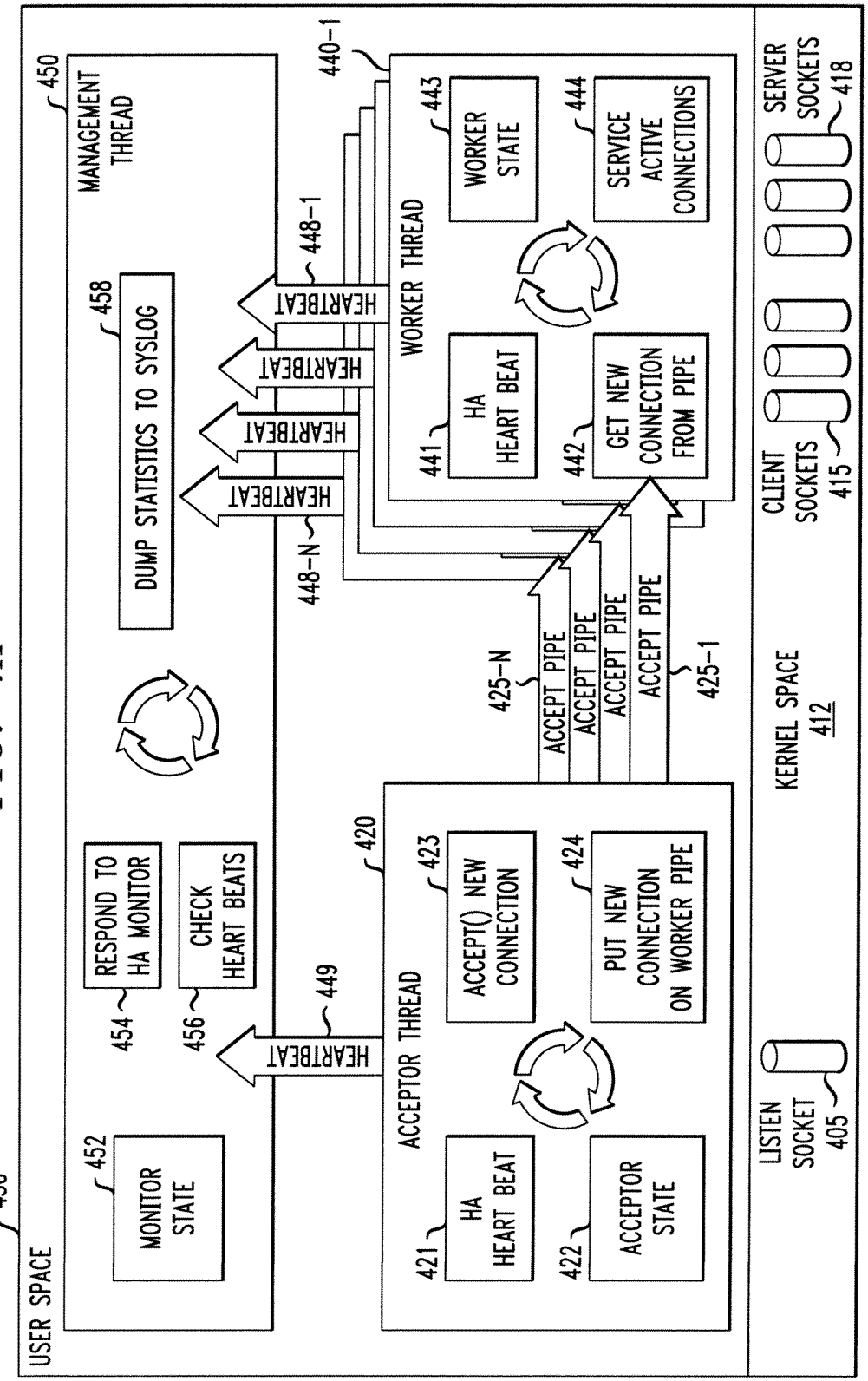
FIG. 4A illustrates the TCP Connection Management and Optimization Module of FIG. 3 in further detail.

FIG. 4A illustrates the TCP Connection Management and Optimization Module 310 in further detail. As indicated above, the TCP Connection Management and Optimization Module 310 manages all inbound and outbound connections and the data flow between the source and destination. As shown in FIG. 4A, the exemplary TCP Connection Management and Optimization Module 310 comprises a listen socket 405 that receives redirected network traffic, a kernel space 412, a plurality of client sockets 415 for communicating with clients, and a plurality of server sockets 418 for communicating with servers.

In addition, the exemplary TCP Connection Management and Optimization Module 310 further comprises an acceptor thread 420, a plurality of worker threads 440-1 through 440-N and a management thread 450 in a user space 430. Generally, the acceptor thread 420 accepts new connections from clients, then passes on those connections to the worker threads 440. The worker threads 440 service connections handed to them by the acceptor thread 420. The management thread 450 monitors the performance of the acceptor thread 420 and the worker threads 440 to ensure that they are still functioning properly, and communicate that fact to external agents, if necessary.

The acceptor thread 420 further comprises a highly available (HA) heart beat 421, an acceptor state 422, an accept( ) new connection 423, and a put new connection on worker pipe 424. The acceptor state 422 accepts a redirected flow, and a new connection is accepted at stage 423. Accept pipes 425-1 through 425-N are created between the acceptor thread 420 and each worker thread 440-1 through 440-N and new connections are placed on an accept pipe 425 at stage 424. A heartbeat signal 449 is created by heart beat 421 between the acceptor thread 420 and the management thread 450, to detect if the acceptor thread 420 has stalled.

The worker threads 440 further comprise an HA heart beat 441, a get new connection from pipe 442, a worker state 443, and a service active connections 444. A new connection is obtained at stage 442 from a pipe 425. Active connections are serviced at block 444. A plurality of heartbeat signals 448-1 through 448-N are created by the heart beat 441 between each worker thread 440 and the management thread 450

The management thread 450 further comprises a monitor state 452, a respond to HA monitor 454 (to provide an acknowledgement or an "I See You" message), a check heart beats block 456 ensures that a thread does not stall, and a block 458 provides statistics to a system log (SYSLOG).

FIG. 4B illustrates an exemplary interface 480 for the Appliance Management Console 330 to manage (e.g., define and configure) the network optimization appliance 300. As shown in FIG. 4B, the exemplary interface 480 comprises two panels 482, 484 for specifying parameters for the network optimization appliance 300.

Figure 4C:
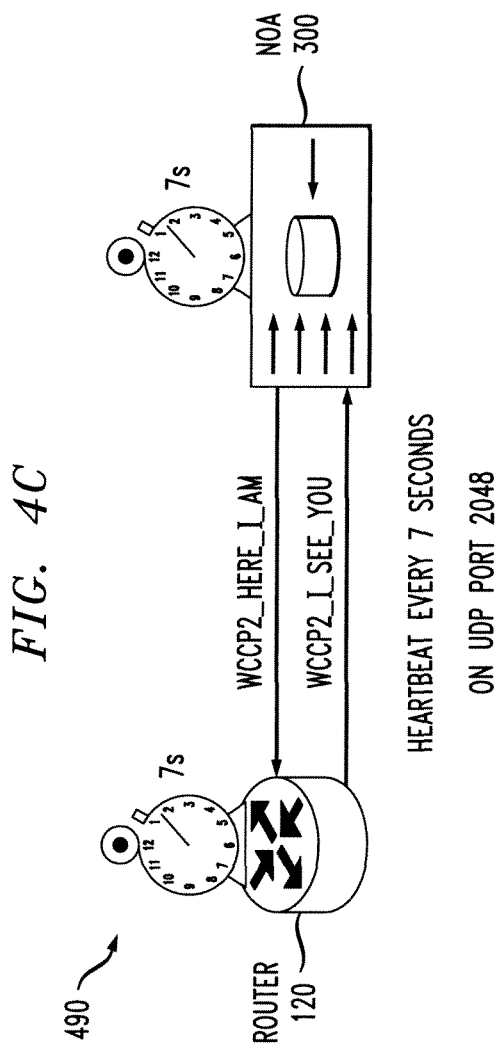
FIG. 4C illustrates an exemplary implementation of the WCCP (Web Cache Communication Protocol) Communication and Redirection Controller of FIG. 3.

FIG. 4C illustrates an exemplary implementation of the WCCP Communication and Redirection Controller 340. As shown in FIG. 4C, the exemplary WCCP Communication and Redirection Controller 340 implements a WCCP client for configuring and maintaining connectivity with the router 120 to redirect specific traffic to the appliance 300 including: session initiation, negotiation, redirection, and keep-alive message. A heartbeat message can be exchanged on a given port between the router 120 and the network optimization appliance 300, for example, every seven seconds.

Among other advantages, the disclosed network optimizer (a) provides a single point optimization solution, optionally requiring only one box to be deployed per campus; (b) works for all categories of traffic including encrypted traffic, such as SSL; (c) operates in a highly resilient and reliable manner; and (d) interoperates with existing network infrastructure. The disclosed network optimizer is particularly useful for users accessing services over a WiFi network.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
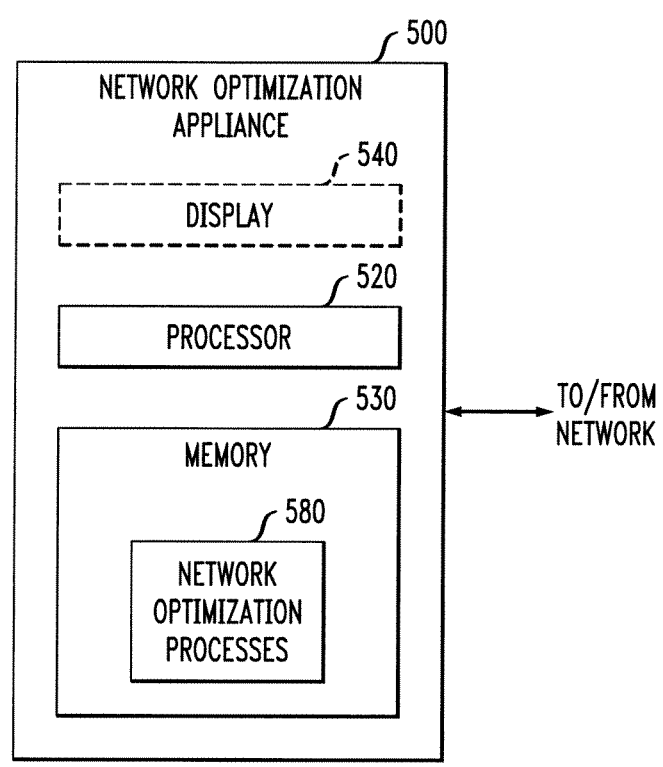
FIG. 5 is a block diagram of a network optimization appliance that can implement the processes of the present invention.

FIG. 5 is a block diagram of a network optimization appliance 500 that can implement the processes of the present invention. As shown in FIG. 5, memory 530 configures the processor 520 to implement the advertisement matching methods, steps, and functions disclosed herein (collectively, shown as 580 in FIG. 5). The memory 530 could be distributed or local and the processor 520 could be distributed or singular. The memory 530 could be implemented as an electrical, magnetic or optical memory, or any combination of these or other types of storage devices. It should be noted that each distributed processor that makes up processor 520 generally contains its own addressable memory space. It should also be noted that some or all of computer system 500 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A network appliance for improving wireless network traffic, comprising:
   a port for receiving selectively redirected network traffic of a given session at said network appliance from a network router based on one or more configuration rules that selectively redirect network traffic that matches one or more predefined criteria, wherein said given session comprises a plurality of connections;
   a protocol optimizer that improves said wireless network traffic based on one or more optimization rules implemented by a plurality of instances of an optimization process on said network appliance, wherein each of said plurality of instances generates a distinct heartbeat signal on said network appliance, wherein a given instance of said optimization process is associated with a corresponding one of said plurality of connections; and
   a process monitor, on said network appliance, that separately monitors each of said distinct heartbeat signals of said plurality of instances of said optimization process running on said network appliance to determine whether one or more of said plurality of instances of said optimization process within said session have failed and to automatically restart a failed optimization process instance.

2. The network appliance of claim 1, further comprising a management console that provides an interface to manage said network appliance.

3. The network appliance of claim 1, wherein said configuration rules specify that at least a portion of said wireless network traffic that is processed by said network appliance is marked.

4. The network appliance of claim 1, wherein said configuration rules specify a given port where said wireless network traffic should be forwarded for network optimization.

5. The network appliance of claim 1, wherein said selectively redirected traffic comprises a selected subset of wireless network traffic.

6. The network appliance of claim 1, wherein said process monitor determines if one or more process threads have stalled.

7. The network appliance of claim 6, wherein said process monitor monitors a plurality of additional components and is monitored by at least one other component.

8. An apparatus for improving wireless network traffic, the apparatus comprising:
   a memory; and
   at least one hardware device, coupled to the memory, operative to:
   obtain selectively redirected traffic of a given session at a network appliance from a network router based on one or more configuration rules that selectively redirect network traffic that matches one or more predefined criteria, wherein said given session comprises a plurality of connections;
   apply said selectively redirected traffic to a protocol optimizer that improves said wireless network traffic based on one or more optimization rules implemented by a plurality of instances of an optimization process on said network appliance, wherein each of said plurality of instances generates a distinct heartbeat signal on said network appliance, wherein a given instance of said optimization process is associated with a corresponding one of said plurality of connections; and
   separately monitor, on said network appliance, each of said distinct heartbeat signals of said plurality of instances of said optimization process running on said network apparatus to determine whether one or more of said plurality of instances of said optimization process within said session have failed and to automatically restart a failed optimization process instance.

9. The apparatus of claim 8, wherein said at least one hardware device is further configured to provide a management interface to manage said apparatus.

10. The apparatus of claim 8, wherein said configuration rules specify that at least a portion of said wireless network traffic that is processed by said apparatus is marked.

11. The apparatus of claim 8, wherein said configuration rules specify a given port where said wireless network traffic should be forwarded for network optimization.

12. The apparatus of claim 8, wherein said selectively redirected traffic comprises a selected subset of wireless network traffic.

13. The apparatus of claim 8, wherein said at least one hardware device is further configured to monitor one or more process threads to determine if said process threads have stalled using a process monitor.

14. The apparatus of claim 13, wherein said process monitor monitors a plurality of additional components and is monitored by at least one other component.

15. An article of manufacture for improving wireless network traffic, comprising a non-transitory machine readable recordable medium containing one or more programs which when executed implement the steps of:
  receiving selectively redirected traffic of a given session at a network appliance from a network router based on one or more configuration rules that selectively redirect network traffic that matches one or more predefined criteria, wherein said given session comprises a plurality of connections;
  applying said selected redirected traffic to a protocol optimizer that improves said wireless network traffic based on one or more optimization rules implemented by a plurality of instances of an optimization process on said network appliance, wherein each of said plurality of instances generates a distinct heartbeat signal on said network appliance, wherein a given instance of said optimization process is associated with a corresponding one of said plurality of connections; and
  separately monitoring, on said network appliance, each of said distinct heartbeat signals of said plurality of instances of said optimization process running on said network appliance to determine whether one or more of said plurality of instances of said optimization process within said session have failed and to automatically restarting a failed optimization process instance.

16. The article of manufacture of claim 15, further comprising the step of providing a management interface to manage said network appliance.

17. The article of manufacture of claim 15, wherein said configuration rules specify that at least a portion of said wireless network traffic that is processed by said network appliance is marked.

18. The article of manufacture of claim 15, wherein said configuration rules specify a given port where said wireless network traffic should be forwarded for network optimization.

19. The article of manufacture of claim 15, wherein said selectively redirected traffic comprises a selected subset of wireless network traffic.

20. The article of manufacture of claim 15, wherein said monitoring step further comprises the step of monitoring one or more process threads to determine if said process threads have stalled using a process monitor.

* * * * *